July 5, 1960

C. R. KEYS 2,943,753

EQUIPMENT FOR LOADING, HAULING AND DUMPING LOOSE MATERIALS

Filed April 18, 1956

INVENTOR
Conrad R. Keys

BY
ATTORNEYS

July 5, 1960

C. R. KEYS 2,943,753

EQUIPMENT FOR LOADING, HAULING AND
DUMPING LOOSE MATERIALS

Filed April 18, 1956

INVENTOR
Conrad R. Keys

BY Lancaster, Allwine & Rommel
ATTORNEYS

INVENTOR
Conrad R. Keys

BY *Lancaster, Allwine & Rommel*
ATTORNEYS

July 5, 1960

C. R. KEYS 2,943,753

EQUIPMENT FOR LOADING, HAULING AND DUMPING LOOSE MATERIALS

Filed April 18, 1956

INVENTOR
Conrad R. Keys

BY Lancaster, Allwine & Rommel

ATTORNEYS

July 5, 1960

C. R. KEYS 2,943,753

EQUIPMENT FOR LOADING, HAULING AND
DUMPING LOOSE MATERIALS

Filed April 18, 1956

INVENTOR
Conrad R. Keys

BY *Lancaster, Allwine Rommel*

ATTORNEYS

United States Patent Office 2,943,753
Patented July 5, 1960

2,943,753

EQUIPMENT FOR LOADING, HAULING AND DUMPING LOOSE MATERIALS

Conrad R. Keys, 702 Ridge St., Newark, N.J.

Filed Apr. 18, 1956, Ser. No. 579,030

12 Claims. (Cl. 214—317)

This invention relates to improvements in receptacles for the efficient and expeditious loading and dumping of loose materials, either wet or dry, or a mixture of the same. The improved receptacle is adapted for use with available loading, hauling and dumping equipment, including cranes, hoisting vehicles or other equipment for tilting and dumping the receptacle.

The primary object of this invention is the provision of an improved receptacle or bucket adapted to meet the needs of the current and increasing collection of refuse around such establishments as super markets, retail stores, hospitals, housing units, eating places, etc. Generally this refuse is in the form of garbage, vegetable waste, sweepings, factory wastes, disposable packaging and other loose materials. Generally, such materials accumulate quickly, and it has been an increasing problem to efficiently and economically handle it. The improved receptacle of the present invention includes an arrangement of parts which enables the quick loading and mass accumulation of materials therein from docks, platforms and other locations; the same having discharge closure means, such as will enable the expeditious dumping of the materials therefrom without the necessity of manual intervention and manipulation of the closure means.

A further object of this invention is the provision of an improved receptacle construction, adapted for the collection and dumping of loose materials, which can be manufactured and sold at comparatively low cost, consistent with the strength and durability and interchangeability of the parts thereof. Since the materials to be handled in many cases are socially objectionable; the improved receptacle construction includes an improved closure means to prevent escape of objectionable odors, and access of insects and drainage water to the receptacle chamber. Its construction enables the satisfactory handling of materials from a sanitation and good housekeeping standpoint, even over considerable periods of time, in all sorts of weather. The chamber of the receptacle may be readily disinfected and cleaned.

A further object of this invention is the provision of a loading and dumping receptacle adapted to be used with vehicles having hoisting equipment for manipulation of the receptacle wherein means is provided for the automatic opening and shutting of discharge closures as an incident of manipulation of the receptacle into and return from dumping positions.

Receptacles of the nature of this invention when placed below platforms and particularly at manufacturing establishments where resilient bundles of paper or other materials are packed by tamping such, at the rear end of the chamber, has a tendency to form a rather solid column at the discharge closure. When the receptacle is tilted into dumping position this solid mass acts as a slug to keep the contents from discharging. It is therefore an important object of this invention to so arrange the closure that the discharge opening extends not only along the rear wall of the receptacle but also along the normal top of the receptacle, which when the receptacle is moved into dumping position will freely discharge the contents from the receptacle; thus breaking the compacting effect of the tightly packed material to be discharged.

A further object of this invention is the provision of a heavy and ruggedly constructed receptacle for the purposes above described which is provided with a discharge opening and closure means therefrom constructed in such a manner that when it is tilted for dumping from a comparatively high vehicle all parts of the closure will be at a reasonably good distance from the ground or sanitary land fill, and therefore unlikely to be damaged by contacting objects on the fill, dump or ground.

A further object of this invention is the provision of an improved loading and dumping receptacle having rear discharge closure means so arranged that the chamber of the receptacle provides a sort of sump into which objectionable and odorous draining fluids may collect; the receptacle still being provided with a discharge opening which is of such rear and top area as to facilitate efficient and quick dumping of the contents from the receptacle no matter how tightly such may be packed.

In the accompanying drawings forming a part of this specification, and wherein similar reference characters designate corresponding parts throughout the several views.

In the drawings, wherein for the purpose of illustration are shown preferred and modified forms of the invention, the letter A may generally designate a loading and dumping receptacle having the general characteristics of the loading and dumping receptacle set forth in my co-pending applications Serial No. 463,646, filed October 21, 1954, and Serial No. 536,649, filed September 26, 1955; the same being improved in the closing and latching features. This type of receptacle is adapted to be used in connection with a vehicle or truck body B having hoisting equipment C thereon. The receptacle A furthermore includes a rear dumping or discharge closure construction D and has associated therewith a closure latch and closure opening construction E. In lieu of the latch construction E other latch constructions may be used for closures of this general type of receptacles which are shown in the drawings at F (Figures 11–15); G (Figures 16–19); and H (Figures 20–24).

The receptacle A is of the general type set forth in the objects of this invention and may be hoisted and dumped either by means of equipment located upon the vehicle or by other means. If a vehicle B having hoist means C is used for handling the receptacle A, such may include a chassis frame 25 having running gear 26. The hoist means C includes a pair of lift arms 27 pivoted at 28 at the rear of the frame 29 located upon the chassis 25, at each side thereof, and operated by hydraulic means 30. Such type of vehicle for manipulating loading and dumping receptacle is shown in Patents 2,200,020; 2,313,514 and 2,069,697 and need not be further enlarged upon in this application. The vehicle B includes a dump hook 31 pivoted upon the rear of the frame 29 collapsible into a slot 32 or extensible therefrom for assisting in tilting the receptacle into dumping position; this dump hook 31 being operable by control equipment located in the cab of the vehicle as is well understood by those skilled in the art to which this invention relates.

The boom arms 27 are each supplied with a pair of flexible chains 36 having key plates 37 at the lower ends thereof for releasable attachment to dumping lugs 38 located in spaced relation upon each side of the vehicle.

Other means may be provided for manipulating the bucket, such as a crane or other free swinging hoist means.

Referring to the construction of the receptacle A, the same includes a bottom wall 40$^a$, side walls 40, top wall 41, front end wall structure 42 and a rear wall 43. The top and bottom walls may be in parallel or angular relation. The front wall structure 42 may include an upper wall portion 43$^a$ positioned at right angles to the top and bottom walls; an intermediate wall portion 44 which is slightly angled downwardly to the rear, and a bottom or more acutely angled portion 45. The so-called rear wall 43 is diagonally sloped at an acute angle to the vertical, forwardly, and is connected to the bottom and side walls. All of the walls are welded or otherwise securely connected together. It is necessary to provide a rear sloping wall 43 in order that the bottom of the receptacle chamber 46 forms a sort of sump for collection of liquids. The slope of the wall 43 enables easy tilting of the bucket to dumping position off the rear apron 44$^a$ of the vehicle, and facilitates discharge of the receptacle contents.

Figure 6:
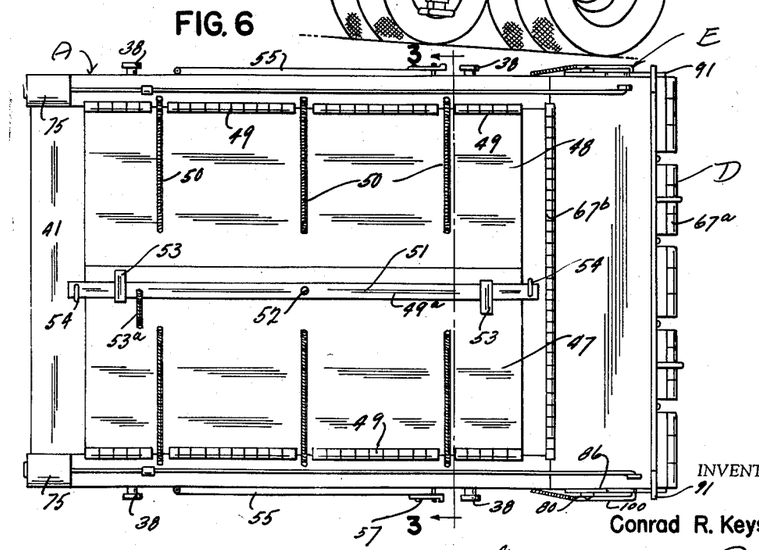
Figure 6 is a plan view of the receptacle showing the structural features thereof.

The top wall 41 is very small in area, since almost the entire top of the receptacle is opened to permit charging of materials into the chamber 46. To that end a pair of closures 47 and 48 are hingedly connected at 49 to the top wall structure 41 along the sides of the receptacle; the closures 47 and 48 extending practically the full length of the top wall structure but terminating short of the rear margins of the side walls of the receptacle and short of the front wall structure 42; the length and the structure of these walls being shown in Figure 6 and elsewhere. The closures have an overlap strip at 49$^a$, such strip being located on the closure 47 and secured thereto. The hinges 49 are of interrupted type, as shown in Figure 6. The closures 47 and 48 are provided with springs 50; the line of tensioning of which lie below the axes of the hinges 49 when the doors are closed in order that the effect of the springs 50 is to normally tend to shut the closures or doors 47 and 48. The closures 47 and 48 have a pivoted bar type of latch consisting of the bar member 51 spring urged at 53$^a$ and pivoted at 52 upon the closure 47, its movement being limited by straps 53. Its ends extend over the wall portions 41 forwardly and rearwardly of the top charging opening for engaging hooks 54, as shown in Figure 6. The plate 49$^a$ is secured to the closure 47 and covers the joint at the free ends of the closures. Side charging doors 55 are forwardly pivoted at 56 upon each side wall 40. Hasps and suitable latching or locking means 57 are also provided therefor.

Figure 4:
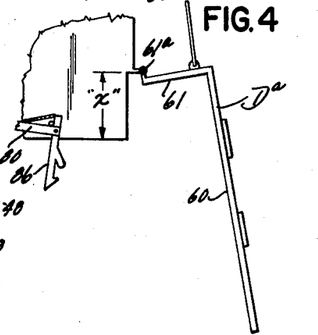
Figure 4 is a fragmentary side elevational view showing a one piece closure of the receptacle in an opened position, and with the receptacle in dumping position.

The type discharge closure construction D$^a$ shown in Figure 4 may consist of a one piece L-shaped construction including the rear main body portion 60 and an upper roof portion 61. The rear discharge opening thus extends vertically upon the container from its rear lower end wall to the plane of the top wall 41 and thence forwardly for a short distance designated at "X" in Figure 4 of the drawings. The portion 61 of the door closes over the opening portion "X" and the main body portion 60 is adapted to close the main rear part of the discharge opening.

Figure 1:
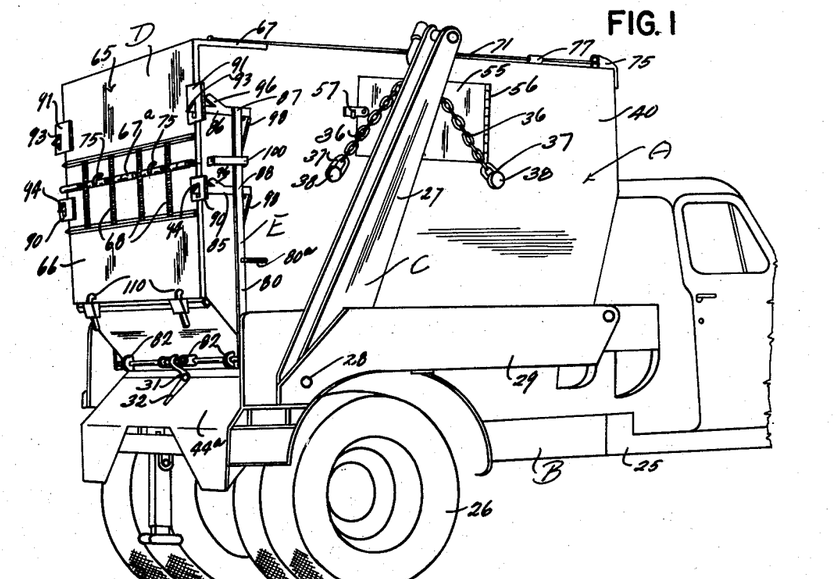
Figure 1 is a perspective view of a truck or vehicle having hoisting equipment showing the improved receptacle of this invention in transporting position thereon.
Figure 2:
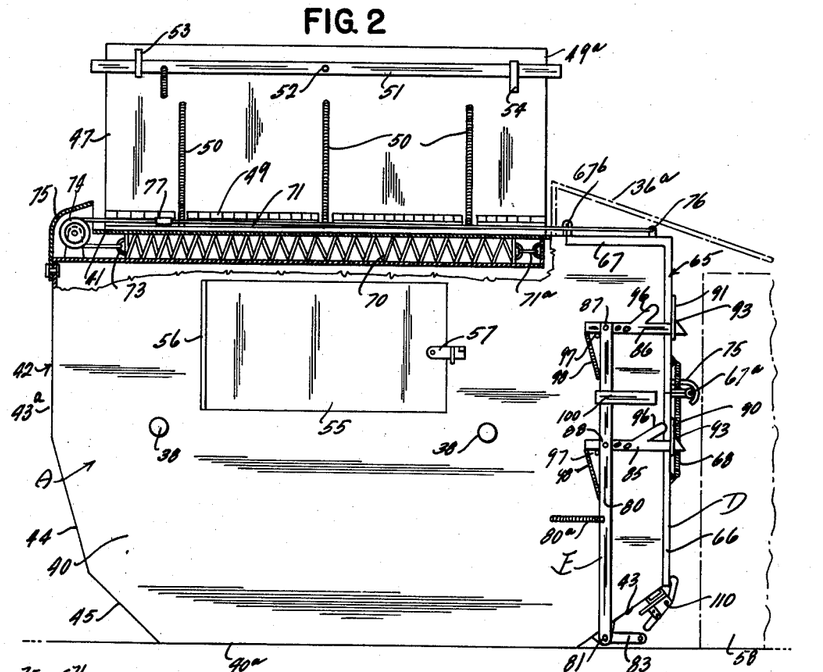
Figure 2 is a side elevational view, partly in section, showing the improved receptacle in loading position upon the ground at the side of a dock or platform, the view showing the top charging doors opened to enable filling of the chamber of the receptacle off of a runway.

Preferably, the rear closure construction D in the other views of the drawings, Figures 1, 2, 3 and 5 to 10 inclusive consists of an upper door section 65 and a lower door section 66 pivoted by interrupted hinges 67$^a$ to the outer margin of the door portion 65. The upper portion 65 includes a closure extension 67, corresponding to the closure portion 61 of the door D$^a$, which is adapted to cover the roof part of the discharge opening. As has been set forth in my co-pending application, above mentioned, the door portions 65 and 66 of this application are preferably provided with spring 68 the tension lines lying below the axis of the hinges 67$^a$, when the doors are closed, as shown in Figure 2. The tension of these springs 68 normally holds the lower door section 66 closed.

Figure 3:
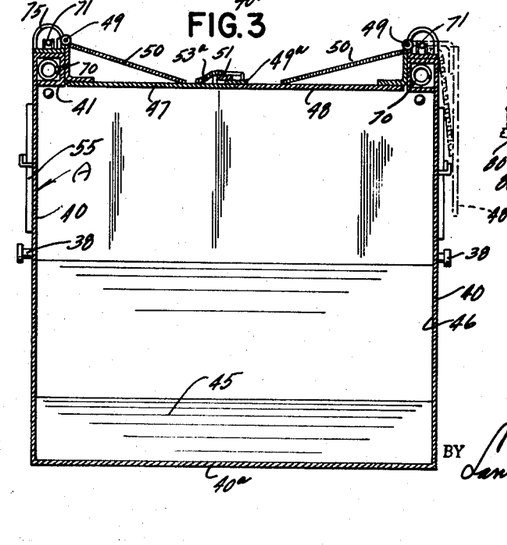
Figure 3 is a transverse cross sectional view taken through the receptacle substantially on the line 3—3 of Figure 6.

Main spring means is provided to assist in moving the entire closure construction D to an opened position after a predetermined tilt of the receptacle. This preferably consists of two of the type of spring and cable constructions for the rear closure arrangement as has been set forth in my co-pending application Serial 536,649, filed September 26, 1955. As shown in Figures 2 and 3 of this application, the top wall structure 41 is boxed at the juncture of the top and side walls and receives therein powerful spiral coil type springs 70 secured at their rear ends at 71ª to the receptacle body and at the opposite end having a cable 71 attached thereto at 73. Each cable 71 is trained around a sheave 74 rotatably mounted upon and secured to the body of the receptacle at the front top thereof. A guard shield 75 may be provided therefor. Each cable 71 at its top portion extends forwardly from its sheave and is secured at a location 76 to the upper closure section 65 at a location rearwardly of the hinge 67ᵇ. The normal effect of the springs 70 is to facilitate opening of the closure construction D as the receptacle is tilted. The springs 70 are under tension and safely secreted and guarded within the boxing arrangement provided therefor upon the receptacle. A stop 77 is provided upon each cable 71 adapted to limit the door opening tendency of the tensioning force when the stop gets into the vicinity of the sheave 74. These springs are provided for the closures D and Dª and also for other closures associated with the latching means as shown at H to be subsequently described.

It is noted that the top line portion of each cable 71 lies below the axis of the hinge 67ᵇ of the extension 67 upon the rear marginal portion of the top wall 41 when the rear closures are shut. Thus, the force of these springs normally tends to hold the upper section 65 over the discharge opening. These springs could also have their upper cable portions extended through the axes or above the axes of the closures, in which case the action of the springs with the doors closed would either be neutral or normally tending to urge the doors to opening positions.

Figure 9:
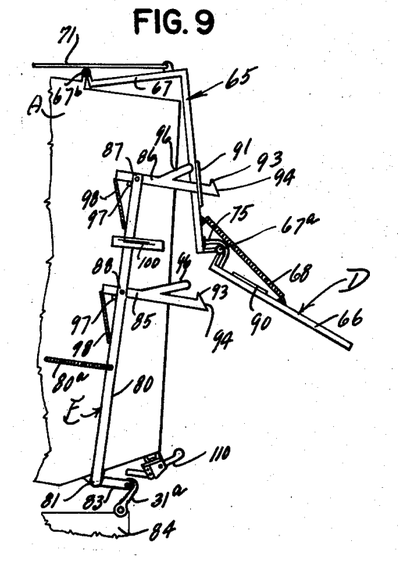
Figure 9 is a fragmentary side elevational view showing the receptacle at the start of its tilting operation, with its closure means initially opened with respect to the receptacle body and the closure latching mechanism.
Figure 10:
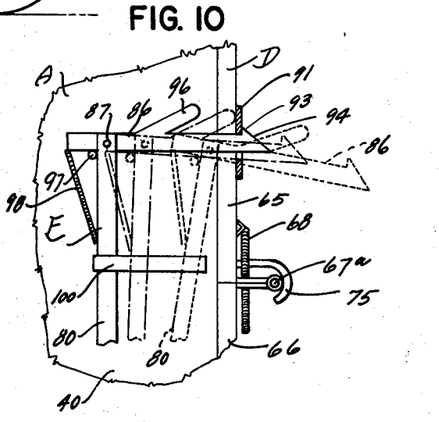
Figure 10 is an enlarged view, partly in section, showing in full lines the latch position of the discharge closure upon the receptacle and in dotted lines showing the various positions which are assumed by the latching and closure opening mechanism as the receptacle is moved to various dumping positions.
Figure 11:
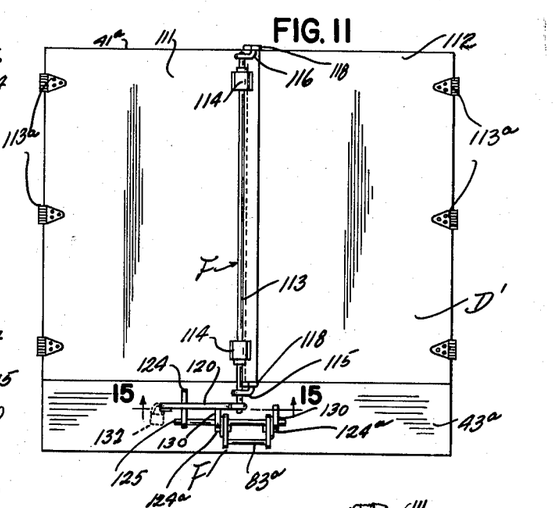
Figure 11 is a rear view of one of the receptacles having a different closure arrangement than that shown in the figures above described and with a different latching means for the control thereof.
Figure 12:
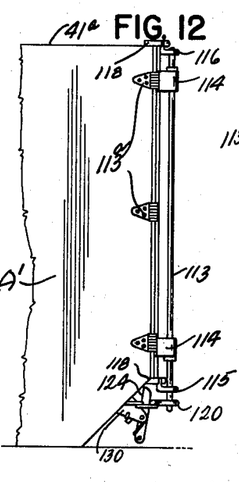
Figure 12 is a side elevation of the rear end of the receptacle having the closure and latching means of Figure 11.
Figure 13:
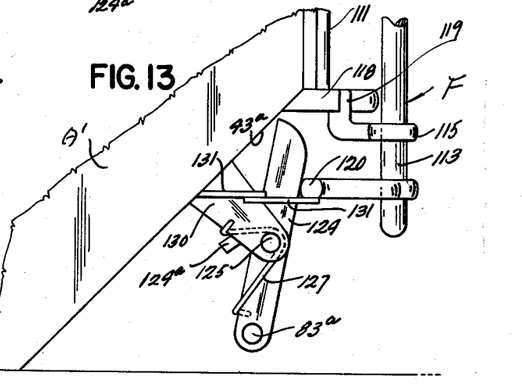
Figure 13 is a fragmentary enlarged view showing the details of the latching means of Figure 11, with the closure shut.
Figure 14:
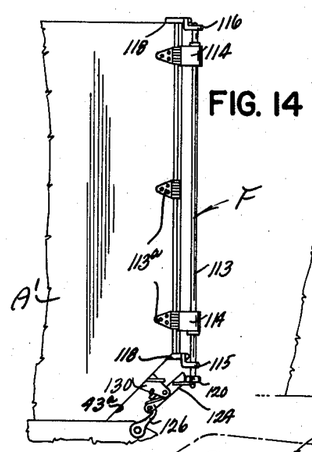
Figure 14 is a fragmentary side elevation showing details of the latching means in position to be operated for the opening of the closure by means of a tilting hook located on a dock or platform.

The construction E is intended not only for the purpose of latching the entire door construction D or Dª as the case may be, but also to offer means to initially open the discharge doors as the receptacle is tilted. (Figure 9). Thus, the lower door section 66 is nudged to a degree of opening which will enable the springs 68 to take effect and swing the closure portion 66 open with respect to the closure portion 65 to the maximum extent as limited by the stops 75. The latter are detailed in my applications above mentioned. The latch means E also initially opens the closure portion 65 as the receptacle A is tilted to a point that the line of the cable 71 passes above the axis of the hinge 67ᵇ. As shown in Figure 9, the force of said springs 70 will assist in throwing the discharge closures to an opened position; the fully opened position being shown in the dumping views of the receptacle in Figures 5 and 7 of the drawings.

Figure 7:
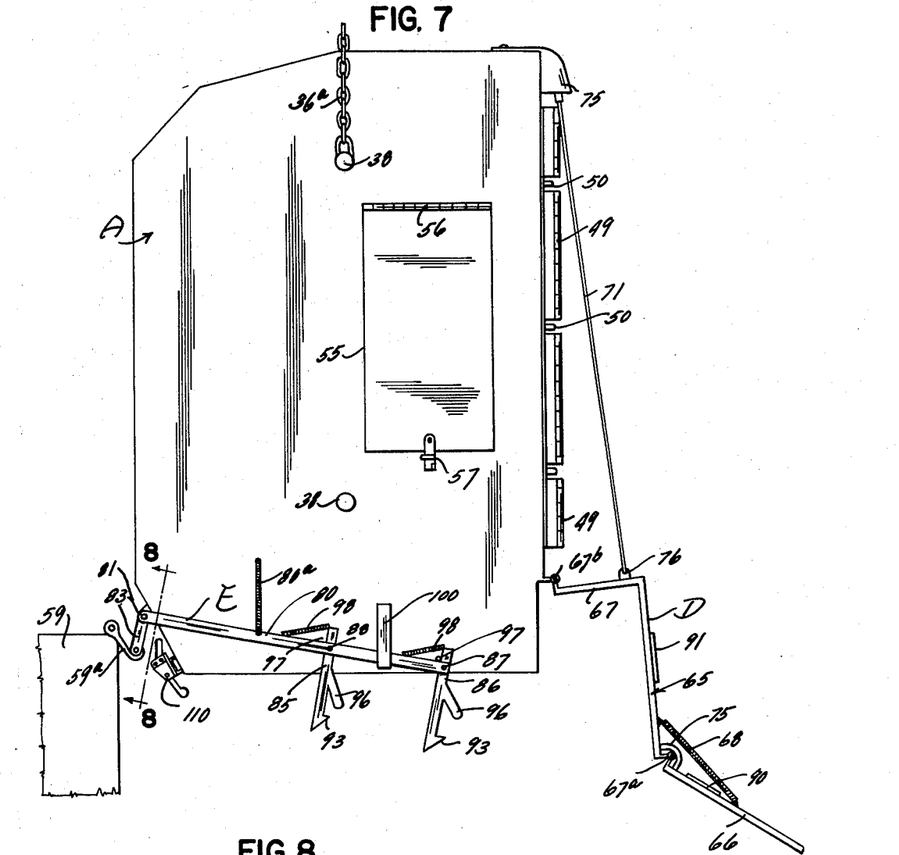
Figure 7 is a side elevational view of the receptacle showing the same in crane or chain supported dumping position with respect to a dock, pier or platform.
Figure 8:
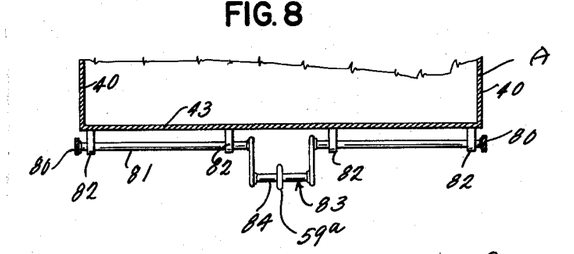
Figure 8 is a fragmentary view, partly in section taken on the line 8—8 of Figure 7, showing an improved type of dump bar for the receptacle, adapted to be associated with latching mechanism for operating the latter.

Each latch means E includes a latch supporting lever 80 at opposite sides of the receptacle close to and over the opposite side walls 40 at the receptacle rear end, as shown in the drawings. These levers 80 are rigidly connected upon the ends of a dump bar 81 pivotally supported by brackets 82 welded upon the rear wall 43 of the receptacle A, as shown in the various views of the drawings. The dump bar 81 intermediate its ends is provided with a downwardly offset crank which includes a bar 84 in position to be engaged by the trip hook 31 of the vehicle 29 when the receptacle A is to be dumped, or engaged by a similar trip hook 31ª or 59ª located upon a dock 84 or platform 59 from which the receptacle A is to be dumped, as is shown in Figures 7 and 9 of the drawings. The normal position of each lever 80 is almost vertical when its latches are engaging the door construction D with the receptacle A in horizontal position. When the receptacle is tilted so the trip hook 31 or 31ª or 59ª engages the crank portion 83, the levers 80 will be swung to the rear for releasing the doors for opening, and also giving slight pushing movement to the closures 65 and 66 for initially opening them.

The levers 80 are each provided with lower and upper latches 85 and 86, pivoted respectively at 88 and 87 upon them. They cooperate with striker plates or members 90 and 91 upon the door sections 66 and 65 respectively. These striker plates or members 90 and 91 are provided with slots for receiving the catch ends 93 of the latches; the said catch ends 93 being edge sloped at 94 so they may cam against the top edges of the slots of the striker plates when moved into latching position. Each of the latches 85 and 86 is provided with push extensions 96 thereon, adapted, after the initial motion of the levers 80 incident to tripping of the dump bar, to engage against the respective striker plates or members 90 and 91, laterally of the slots therein, for causing initial opening movements of the closures 65 and 66. First, the latch 85 is tilted to a position where it will be free to move out of the slot in its striker plate, and thereafter its push extension 96 will nudge the closure 66 for a slight opening movement with respect to the companion closure 65 until the springs 68 take over and move the closure 66 to the position shown in Figure 9. The latch 86 acts likewise, and as tilting of the receptacle A proceeds, the extension 96 of latch bar 86 will engage its striker plate 91 and move the closure 65. The dot-dash and dotted line positions shown in Figure 10 indicate these movements. After the initial opening the powerful top springs 70 will take over and cause the closure construction D to fully open as the tilting of the receptacle proceeds to a dumping position, such as shown either in the vehicle type of device of Figure 5 or the crane type of device in Figure 7.

The latches 85 and 86 have stops 97 which normally limit movements of the latches, and tension springs 98 are provided for each of the latches 85 and 86 normally causing them to engage said stops 97 in the positions shown in the drawings. The latches are free to swing away from said stops in order to cam themselves against the striker plates 90 and 91 into latching positions in the slots of said plates.

Movements of the levers 80 are caused by engagement of the trip hook with the crank portion of the dump bar assembly in order to move said levers rearwardly more rapidly than the receptacle is moving to a rear tilted position. That is the reason the latches can operate in the above manner, not only for moving them to released positions but also enabling their push extensions to shove each of the closures to slightly opened positions in order that the tension of the springs 70 controlling their opening movements thereof may come into play.

It is within contemplation of the invention to make mounting of the latches upon the levers 80 adjustable, as by providing extra pivot openings (see Figure 2) or some other expedient to accomplish this. The levers are limited in motion by the U-shaped guide straps 100 provided therefor upon the side walls of the receptacle. Springs 80ª normally act to throw the levers 80 to latching positions.

Figure 5:
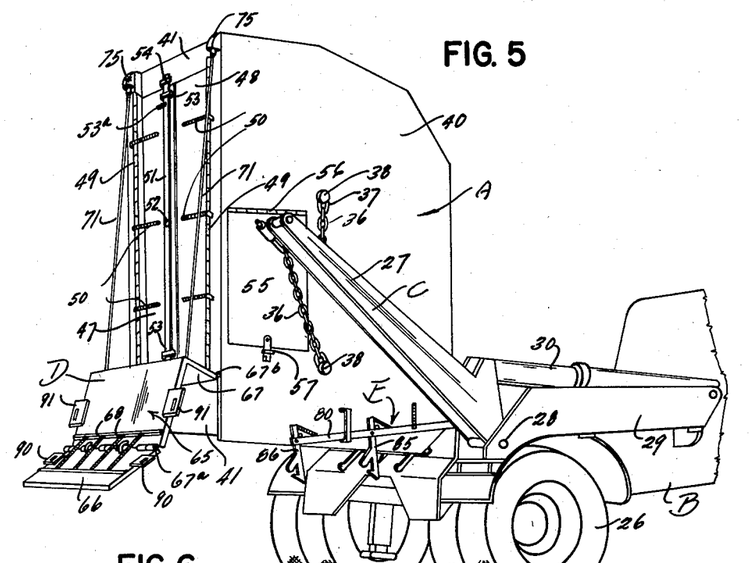
Figure 5 is a perspective view showing the receptacle in dumping position upon the vehicle supported by the hoist mechanism of the vehicle.

The full dumping position of the receptacle is shown in either Figures 5 and 7. It is readily observable from the fully opened positions of the rear closures D that there will be a free break away of the material packed in the conatiner due to the provision of the inverted L-shaped discharge opening.

As the receptacle A is being rotated to a return position the weight of the discharge closures will cause the same to return to contact with the receptacle since the pull and effect of the springs 70 is not enough to hold them opened. As the doors swing against the receptacle, when the receptacle is horizontal and back upon the vehicle or dock and the dump hook has disengaged the dump bar, the striker pieces will be enabled by action of the springs 98 to be engaged by the latches. The lower half 66 of the discharge door may have to be manually closed. It is held closed by latches 110. They are such latch mechanisms as shown and described in my co-pending application Serial 536,649, filed September 26, 1955.

One mode of using the receptacle is shown in Figure 2 at a dock 58 resting upon the ground or fill for charging. A runway 36$^a$ may be provided to enable charging through the top openings from the dock.

It will be apparent from the foregoing that an improved closure and latching construction has been provided for loading and dumping receptacles, adapted for hauling huge loads of waste or other materials, in which the latching the closures is almost fully automatic, so far as release and latching is concerned, and in which means is provided for a less costly and more expeditious discharge of the receptacle contents.

Figure 15:
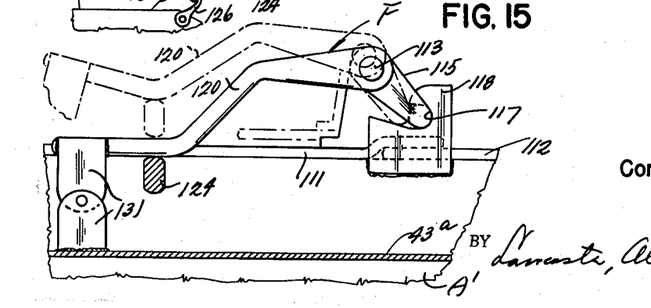
Figure 15 is a fragmentary view, partly in cross sectional view showing in full lines the position of the latching means when holding the closure shut, and in dotted lines showing the releasing position of the latching means with respect to the closure.

Referring to the latching means F shown in Figures 11 to 15 of the drawings, the receptacle A' has a closure construction D' at the rear thereof consisting of a pair of doors 111, and 112, hinged at 113$^a$ at the sides of the receptacle; the doors or closures overlapping at their free margins as shown in dotted lines in Figure 15.

The latch mounting means has a crank trip hook actuated dump bar. The latching mechanism preferably includes a vertical rotatable locking bar 113 mounted for sliding in brackets 114 upon the closure 111; the ends of which are provided with right angled latching extensions 115 and 116; the free ends being provided with upwardly extending right angled portions 119 for releasable connection in notches 117 of striker plates 118 provided therefor. The striker plates 118 are located upon the top wall 41$^a$ of the receptacle D' and the sloping bottom wall 43$^a$ of the rear wall, in the position shown in Figure 11.

The means for turning the rod 113 includes a lever extension 120 welded to the rod 113 and extending laterally thereabove rearwardly of the wall 43$^a$ and against which an arm 124 of the dump bar 125 engages. The dump bar 125 is provided with a crank portion 83$^a$ similar to the crank portion 83 of the dump bar of the form of invention above described. It is adapted to be engaged by a trip hook such as that shown at 126 in Figure 14 of the drawings. A tensioned spring 127 engages about the bracket 130 upon which the dump bar 125 is pivoted and normally tends to move the arm 124 away from lever extension 120 (see Figure 13). The lever 120 and the wall 43$^a$ of the receptacle may have apertured extensions 131 thereon; the apertures of which align in to receive a padlock such as shown in dotted lines at 132 in Figure 11 of the drawings, in order to hold the doors shut and locked. Stop 124$^a$ may be welded to bracket 130 to limit the forward movement of the lower part of lever 124.

It is apparent from the foregoing that when the trip hook 126 engages the crank 83$^a$, during a discharging operation, the padlock 132 having been removed, the arm 124 will engage the lever extension 120, swinging it into the dot and dash line position shown in Figure 15, at which time the latch ends 115 and 116 are released from the keeper plates 118. Tilting of the receptacle then enables the load to swing the doors opened to permit complete discharge of the load.

Figure 18:
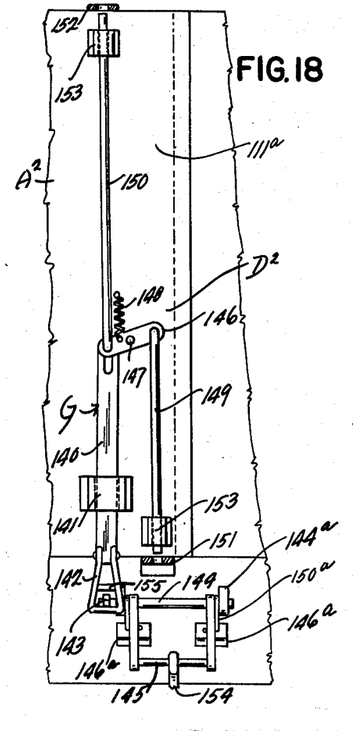
Figure 18 is a rear view of the latching means showing the same in released position to permit opening of the closures.

Referring to the form of latching mechanism G as shown in Figures 16 to 19 inclusive, the same closure arrangement has been shown here as for the latch structure F, comprising a pair of doors 111$^a$ and 112$^a$, side hinged at 113$^b$ and overlapping at their free marginal edges. However, the latch mechanism here consists of a reciprocable slide bar 140 slidably mounted in a bracket structure 141 attached to the closure 111$^a$. The lower end of it has a stirrup 142 the opening of which is adapted to receive an operating extension 143, as shown in Figure 18 and elsewhere. This operating extension is rigidly connected upon a dump bar 144, the crank portion 145 of which is similar to the dump bar construction of the other forms of invention above described. The shaft 144 is mounted in brackets 144$^a$ attached to the rear wall 43$^b$ of the receptacle A$^2$.

The latching means for the closures 111$^a$ and 112$^a$ consists of a lever 146 pivoted between ends at 147, having a spring 148 normally acting to swing the bars 149 and 150 into latching positions in the apertured striker members or plates 151 and 152 respectively provided therefor.

Figures 16, 17:
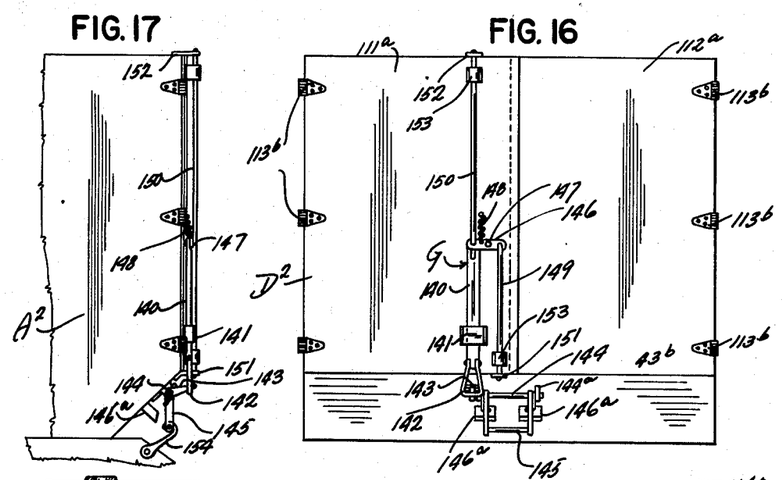
Figure 16 is another form of latching means for the closure construction of the improved dumping receptacle.
Figure 17 is a side elevation showing the receptacle of Figure 16 and its latching means in position upon a dock or support with respect to a trip hook which has not yet operated the latching means.
Figure 19:
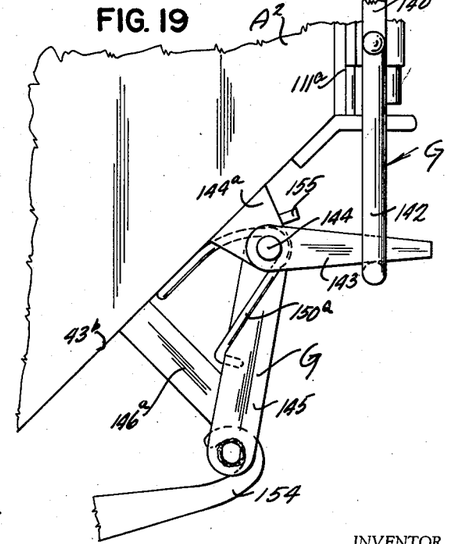
Figure 19 is a view of the latching means in operated closure releasing position by the trip hook.
Figure 20:
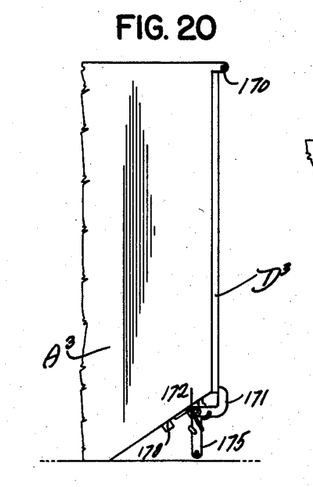
Figure 20 is a view of another form of latching means for the rear discharge closure of the loading and dumping receptacle.
Figure 21:
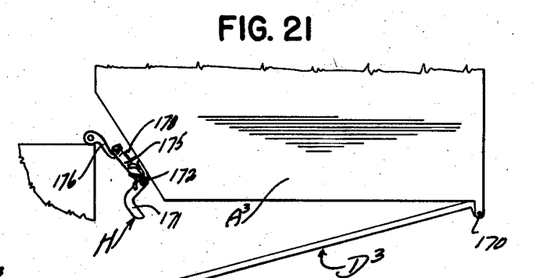
Figure 21 shows the latching means of the form of Figure 20 released by a trip hook to permit the discharge of contents from the receptacle.
Figure 22:
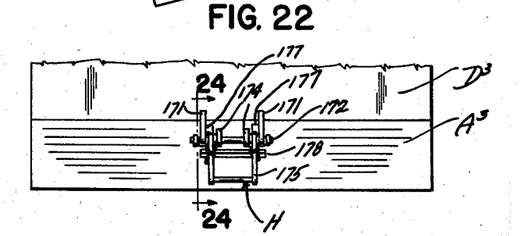
Figure 22 is a rear elevational view of the latching means of Figures 20 and 21.
Figure 23:
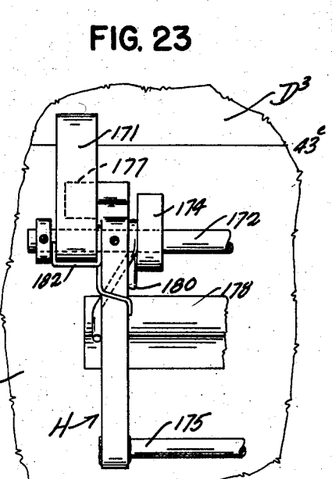
Figure 23 is a fragmentary enlarged view of the latching construction shown in Figure 20.

In operation, for an unlatching of the closures, the trip hook 154 shown in Figure 17 engages the crank 145 of the dump bar 144 and as the receptacle is tilted rearwardly the extension arm 143 engages in the stirrup 142, lowering the bar 140 and thus rocking the lever 146 and unlatching the doors. The tension springs 150$^a$ normally move the crank 145 to the position shown in Figure 17 for holding the doors latched. From this position, as the receptacle is tilted, the trip hook 154 comes into play, engaging the crank 145 and moves the latter to the position against the stops 146$^a$ upon the receptacle as shown in Figure 19, enabling the load to be dumped when the receptacle is sufficiently tilted. A stop 155 (see Figures 18 and 19) limits the up position of arm 143.

Referring to the form of invention H shown in Figures 20 to 24 inclusive, a rear closure D$^3$ is pivoted or hinged at the top of the receptacle at 170, and the lower end of said closure is free swinging. The latch construction H includes L-shaped latching extensions 171 which are fixed upon the ends of a dump bar 172. The latter is pivoted in brackets 174 welded upon the rear wall 43$^c$ of the receptacle A$^3$. The dump bar 172 has a crank arm 175 thereon similar to that of other such forms above described, adapted to be engaged by a trip hook 176 (see Figure 21) for causing movement of the dump bar. The crank 175 has its vertical sides provided with extensions 177 which engage against the forward edges of arms 171 as the crank is rotated. A stop 178 is provided to limit the movement of the crank 175 in the direction of the wall 43$^c$ (see Figure 21). Heavy springs 180 are secured, each at one end to the wall 43$^c$, and at the other ends engaging the side arms of crank 175 are tending to turn the crank into the position shown in Figure 24, at which time the extensions 177 will also engage the wall 43$^c$ at the face 180$^a$.

Figure 24:
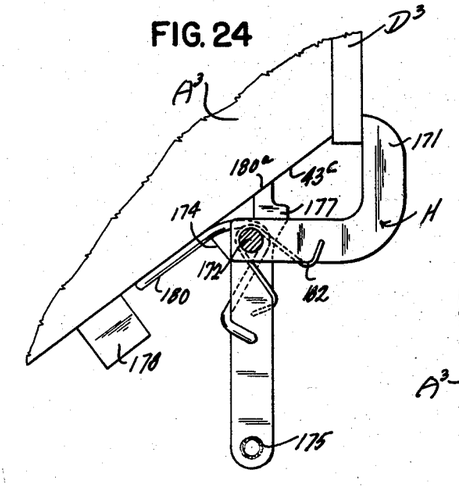
Figure 24 is a side elevational view of the latching means of Figure 20, the view being taken substantially on the line 24—24 of Figure 22.

The springs 182 normally hold the latches 171 in the position shown in Figure 24, from which they may be released as the lateral ends 177 of the side bars of the crank are moved under influence of the trip hook to place the doors in unlatched position for opening.

It is to be noted that in this invention the vehicle or dock trip hook performs the double function of acting as a pivot for tilting the receptacle into dumping position and also as an actuating member for release of the receptacle closure latch means. This is in contradistinction to the invention of my application Serial 463,646 filed October 21, 1954, in which I provide separate means for such purposes.

Various changes in the shape, size and arrangement of parts may be made to the forms of invention herein shown and described, without departing from the spirit of the invention or scope of the claims.

I claim:

1. In loading, hauling and dumping equipment the combination of a vehicle having a frame with means thereon operable to hoist objects at the rear of the vehicle and over the vehicle, a receptacle means having means thereon to enable the receptacle to be lifted by the hoist means upon the vehicle or off of it to the rear, a receptacle tilting member mounted upon the frame, said receptacle having a rear discharge opening therein, a closure mounted upon the receptacle for the rear opening, latch means mounted on the receptacle for holding the closure shut, a transverse dumping shaft pivoted upon the rear lower portion of the receptacle having a crank in position to be engaged by the tilting member of the frame as the hoist moves the receptacle from the vehicle to a rear dumping position, said shaft having a connection with the latch means for releasing the latch means upon tilting movement of the receptacle to a dumping position whereby to enable the push of the material in the receptacle to open the closure means.

2. In a receptacle for receiving loose materials and combination of a casing structure having a chamber therein and a rear discharge opening for the materials, a closure pivoted at its upper portion upon the receptacle at the upper portion thereof for said rear discharge opening and normally acting to open by gravity when the casing is tilted upon its rear lower portion, spring actuated means mounted on the receptacle and positioned to hold the closure in a shut position when the receptacle is in normal loading position and acting to assist in opening the closure as the receptacle is tilted to the rear to initially open the closure to discharge materials from said discharge opening, a latch means pivoted upon the receptacle, the receptacle having a latch operating crank mounted thereon, and means on said latch means engageable with the closure to nudge the same to an initial opening position as the closure is first tilted.

3. A receptacle as described in claim 2 in which the closure comprises multiple sections including an upper part hingedly connected to the receptacle and a lower part hingedly connected to the upper section, the latch means including a latch member for each of the closure sections with means on each of said latch members for initially causing a nudging opening of the respective closure sections as the receptacle is first tilted to predetermined dumping degree.

4. In combination with a dumping receptacle having a chamber therein and a rear discharge opening therefor, closure means for the discharging opening mounted upon said receptacle having a latch receiving keeper thereon a pivoted lever mounted upon the receptacle, a pivoted latch for the keeper mounted upon said lever remote from the lever pivot upon said receptacle, spring means normally urging said latch into latching position with respect to the closure keeper, and a latch operating crank pivotally mounted upon the lower rear portion of the receptacle connected to said pivoted lever and in position to be engaged by a trip hook which is adapted for use in the tilting of said receptacle for discharge of the materials from the discharge opening.

5. A device as described in claim 4 in which the closure is composed of relatively pivoted multiple sections and in which the said pivoted lever is provided with a pivoted latch for each of said sections.

6. In a loading, hauling and dumping receptacle, the combination of a casing including upright side walls, a front wall, a top wall, a bottom wall, said casing having a large rear discharge opening, a discharge closure for the discharge opening pivotally mounted upon the casing, a dump bar pivotally mounted upon the lower rear portion of the casing having a crank intermediate the ends thereof, upright levers pivoted intermediate their ends upon each of the side walls having the lower ends thereof fixedly connected to the dump bar for movement therewith, the crank portion of the dump bar extending rearwardly and transversely to said levers, latching members mounted upon each of the levers remote from the pivot mountings of the levers upon the casing and positioned to engage the closure at each side of the casing for holding the same shut.

7. A receptacle as described in claim 6 in which the closure means for the discharge opening is multipled sectioned with an upper section pivoted upon the receptacle and a lower section pivoted to the lower part of the upper section, and in which the levers at the sides of the receptacle have connected therewith a pivoted latch for each of the closure sections, said pivoted latches having extensions therealong adapted to nudge the respective sections to initially open them as the receptacle is tilted rearwardly to dumping position.

8. In loading and dumping equipment, the combination of a support having hoisting means thereon, a receptacle including a body casing with a rear discharge opening therein, closure means for the discharge opening pivoted at its upper end upon the upper portion of the receptacle for swinging open by gravity as the receptacle is tilted upon its lower rear end, latch means on the casing for holding the closure means shut, and a common means mounted on the casing comprising a pivot permitting tilting of the receptacle into and out of dumping position and including a release for engaging the latch means at the start of a tilting dumping operation of the receptacle to release said latch means in order to permit opening of the closure means as the receptacle is tilted.

9. In loading and dumping equipment, the combination of a support having a member thereon adapted to engage a receptacle for tilting of the receptacle, a receptacle comprising a bottom wall, upright side walls, a front wall, a top wall, said receptacle having a chamber therein and a rearwardly facing discharge opening, a closure for said rear opening hingedly connected to the receptacle at the upper portion thereof, latch means mounted upon the receptacle, the closure having a keeper thereon for receiving the latch means, a pivoted shaft mounted on the rear lower portion of the casing having a rearwardly extending crank portion thereon which is adapted to be engaged by the tilting member when the receptacle is moved upwardly at its forward end for the purpose of enabling a tilt of the receptacle for discharge of the contents of the chamber through the rear discharge opening, and lever means connecting said shaft with the latch means for release operation of the latch means as the crank is moved during a receptacle tilting operation.

10. Dumping equipment as described in claim 9 in which spring means is mounted upon the upper portion of the receptacle connected to said closure to assist in the opening of the closure as it is moved in an opening relation incident to tilt dumping of the receptacle.

11. Dumping equipment as described in claim 9 in which the closure comprises a multiple section door, the sections of which are hingedly connected together, and spring means connecting said door sections and normally acting with a tendency to hold said sections in relatively closed position when the closure is shut upon the receptacle and the receptacle is in normal loading position, and acting to assist in opening of the closure sections and to hold them open as the receptacle is tilted upon said member for dumping purposes.

12. In a material loading, hauling and transporting receptacle, the combination of a casing having a chamber therein and consisting of a bottom wall, a front wall, upright side walls, a top wall, and a rear sump providing wall at the rear bottom of the chamber connected to the side and bottom walls and with the rear sump wall sloping from the bottom wall upwardly and to the rear, said receptacle at the rear above said rear sump wall having a rearwardly facing discharge opening which extends throughout part of the height of the receptacle and extends also from side wall to side wall, said top wall terminating short of said rear opening to provide an upwardly facing discharge opening in continuation with said rear discharge opening, a closure construction movably mounted upon said receptacle comprising a top portion which acts as a closure for the upwardly facing top portion of the discharge opening and a second closure portion which acts as a closure for the rear facing portion of said discharge opening, a transverse tilting bar rotatably mounted externally upon the sump wall having a crank projecting to the rear adapted to be engaged by some tilting member as the casing is rearwardly lowered for the purpose of rotataing said tilting bar upon its axis, and means connected to said bar and to said closure construction actuated upon rotating of said bar to control the opening of said closure construction as the casing is tilted upon said crank.

References Cited in the file of this patent

UNITED STATES PATENTS

| | | |
|---|---|---|
| 789,212 | Duke | May 9, 1905 |
| 1,612,223 | Robinson | Dec. 28, 1926 |
| 1,743,094 | Barrett | Jan. 14, 1930 |
| 1,859,666 | Gredell | May 24, 1932 |
| 2,702,142 | Jones | Feb. 15, 1955 |

FOREIGN PATENTS

| | | |
|---|---|---|
| 203,183 | Germany | Oct. 17, 1908 |